C. WEED.
Steering Apparatus.
No. 18,835.  Patented Dec. 8, 1857.
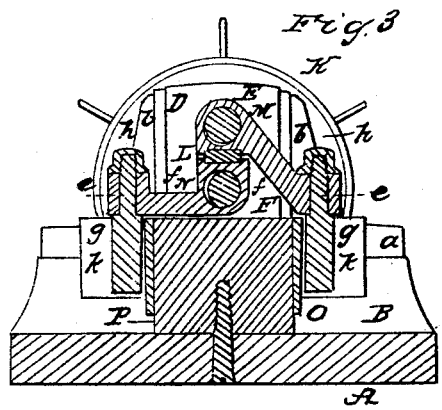
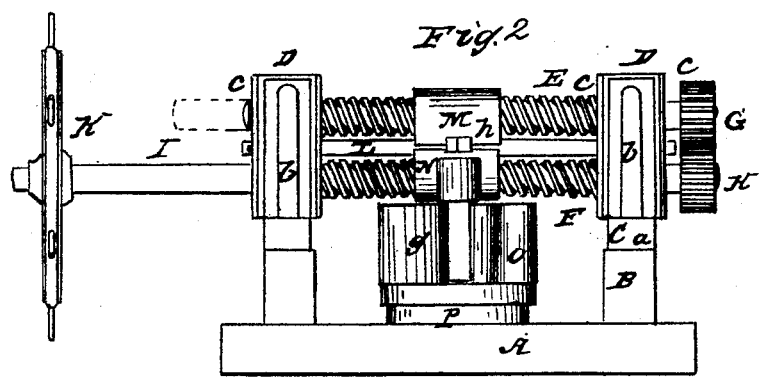
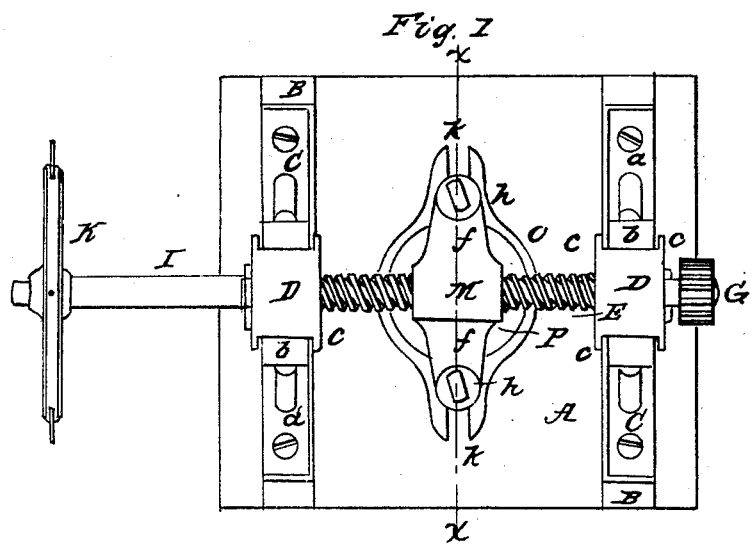

UNITED STATES PATENT OFFICE.

CHAS. WEED, OF BOSTON, MASSACHUSETTS, ASSIGNOR TO HIMSELF AND STEPHEN B. CRAM, OF SAME PLACE.

STEERING APPARATUS FOR VESSELS.

Specification of Letters Patent No. 18,835, dated December 8, 1857.

*To all whom it may concern:*

Be it known that I, CHAS. WEED, of Boston, in the county of Suffolk and State of Massachusetts, have invented certain new and useful Improvements in Steering Apparatus for Vessels, of which the following is a full, clear, and exact description, reference being had to the accompanying drawings, making part of this specification, in which—

Figure 1 is a plan. Fig. 2 a side elevation. Fig. 3 a transverse vertical section on the line $x$, $x$, of Fig. 1.

A, represents the deck of the vessel, from which rise heavy blocks or stanchions B, that support the apparatus. On these blocks are firmly secured the housings C, which are heavy castings formed of a bed piece $a$, and stanchions $b$, rising therefrom; in the spaces between the stanchions $b$ of the housings are placed the boxes D, these boxes are furnished with lips $c$, which embrace the pieces $b$, but the spaces between the lips are made a little wider than the pieces $b$, so that the boxes may have a play a short distance transversely in the housings. The boxes fit snugly between the two pieces $b$ of each housing, but may be lifted up vertically out from between them. Two parallel screws E and F (the thread of each turning in the same direction), one placed immediately over the other, have their bearings in the boxes D, and are furnished with the gears G and H, which engage with each other. The shaft of one of these screws is prolonged as at I, and a steering wheel K of the ordinary construction is attached thereto. A rectangular bar I, lying between the screws E and F and parallel to them, extends from one box D to the other, and is secured at each end to one of the boxes; this bar serves as a brace to hold the boxes at their proper relative distance from each other and also as a guide to two nuts M and N, which travel longitudinally along it. The nut M embraces the screw E, and the nut N the screw F. As the screws turn in opposite directions, the nuts will be moved one forward and the other back as the wheel K is turned. Each of these nuts is extended laterally to one side in an arm $f$, the outer end of which receives the spindle $e$ of a feather $z$. The spindle $e$ turns in the end of the arm and is secured thereto by a nut $h$. Each of the feathers $g$ enters a slit $k$ in the projecting part of the band O which embraces and is firmly secured to the head P of the rudder post, thus as the nuts M and N are moved back and forth by the screws, the rudder post is turned on its axis, the feathers $g$ sliding in the slits $k$. The nuts M and N, where they rest on the bar L, are grooved as shown in Fig. 3, so that they each partially embrace the bar; this prevents any lateral strain or torsion of the nuts from being thrown upon the screws, and causes the bar L to receive it.

I am aware that a guide bar has been used in connection with two parallel screws placed one on each side of it, but in that case each nut could only bear on one side of the bar, and consequently the bar could only receive the lateral strain of each nut in one direction; whereas in my improved arrangement of the relative position of the screws and bar each nut embraces the bar on both sides. Some other advantages which result from this arrangement over all the other steering apparatus with which I am acquainted are, that I dispense with an intermediate gear (without moving the steering wheel away from amidships); that it is cheaper, and more compact, is easily removed by lifting the boxes D up out of the housings C. If either of the gears G or H should break, the rudder could be operated by a single screw (which could not be done where an intermediate gear is used), and if one screw should fail, the steering wheel K could be shifted to the other, the shaft being prolonged as shown in red Fig. 2, for this purpose. As the rudder post has a tendency to work aft, it is necessary that some arrangement be made by which the apparatus may accommodate itself to the altered position of the rudder post, this is done by the space between the lips $c$ of the boxes D, allowing the boxes to move aft in the housings. The space between the lips and the pieces $b$ of the housings may be packed or not as is found most desirable. Instead of the single bar L, two bars may be placed one above the upper and one beneath the lower nut, or one on each side of the two nuts, but the arrangement described is the one which I prefer.

What I claim as my invention, and desire to secure by Letters Patent, is—

1. Placing the parallel screws E and F, one immediately over the other, and connecting them by the gears H, and G; the steering wheel being attached to one of the screws in the manner substantially as described.

2. I claim the stationary guide bar L as arranged with the grooved nuts M and N and bearing blocks D substantially as set forth.

CHAS. WEED.

Witnesses:
 THOS. R. ROACH,
 THOS. L. GLOVER.